US010280271B2

(12) United States Patent
Gerard

(10) Patent No.: US 10,280,271 B2
(45) Date of Patent: *May 7, 2019

(54) LIQUID (METH)ACRYLIC SYRUP FOR IMPREGNATING A FIBROUS SUBSTRATE, METHOD FOR IMPREGNATING A FIBROUS SUBSTRATE, AND COMPOSITE MATERIAL PRODUCED AFTER POLYMERISATION OF SAID PRE-IMPREGNATED SUBSTRATE

(71) Applicant: Arkema France, Colombes (FR)

(72) Inventor: Pierre Gerard, Denguin (FR)

(73) Assignee: Arkema France, Colombes (FR)

( * ) Notice: Subject to any disclaimer, the term of this patent is extended or adjusted under 35 U.S.C. 154(b) by 455 days.

This patent is subject to a terminal disclaimer.

(21) Appl. No.: 14/772,862

(22) PCT Filed: Mar. 7, 2014

(86) PCT No.: PCT/FR2014/050532
§ 371 (c)(1),
(2) Date: Sep. 4, 2015

(87) PCT Pub. No.: WO2014/135816
PCT Pub. Date: Sep. 12, 2014

(65) Prior Publication Data
US 2016/0009878 A1  Jan. 14, 2016

(30) Foreign Application Priority Data

Mar. 8, 2013 (FR) ...................... 13 52119

(51) Int. Cl.
| | | |
|---|---|---|
| C08L 33/12 | (2006.01) | |
| C08J 5/10 | (2006.01) | |
| C03C 25/285 | (2018.01) | |
| D06M 15/263 | (2006.01) | |
| D06M 13/203 | (2006.01) | |
| C08J 5/24 | (2006.01) | |
| C08K 7/28 | (2006.01) | |
| C08K 3/013 | (2018.01) | |
| C08F 220/14 | (2006.01) | |
| C08K 3/36 | (2006.01) | |
| C08L 33/14 | (2006.01) | |

(52) U.S. Cl.
CPC ............... *C08J 5/10* (2013.01); *C03C 25/285* (2013.01); *C08J 5/24* (2013.01); *C08K 3/013* (2018.01); *C08K 7/28* (2013.01); *C08L 33/12* (2013.01); *D06M 13/203* (2013.01); *D06M 15/263* (2013.01); *C08F 220/14* (2013.01); *C08J 2333/12* (2013.01); *C08J 2433/12* (2013.01); *C08K 3/36* (2013.01); *C08L 33/14* (2013.01)

(58) Field of Classification Search
CPC .. C08J 5/10; C08J 5/24; C03C 25/285; C08K 3/0033; C08L 33/12
See application file for complete search history.

(56) References Cited

U.S. PATENT DOCUMENTS

| | | | |
|---|---|---|---|
| 4,344,906 A | 8/1982 | Kitagawa et al. | |
| 6,703,193 B1* | 3/2004 | Laney | C08L 67/02 |
| | | | 428/315.5 |
| 10,040,889 B2* | 8/2018 | Gerard | C08F 220/14 |
| 10,040,934 B2* | 8/2018 | Gerard | D06M 13/203 |
| 10,131,768 B2* | 11/2018 | Gerard | C08K 5/5313 |
| 2002/0004111 A1* | 1/2002 | Matsubara | C03C 3/083 |
| | | | 428/34.4 |
| 2012/0228010 A1 | 9/2012 | Matsuda et al. | |
| 2014/0256850 A1 | 9/2014 | Gerard et al. | |
| 2015/0038650 A1 | 2/2015 | Bourrigaud et al. | |
| 2015/0218362 A1* | 8/2015 | Gerard | C08F 265/06 |
| | | | 524/257 |
| 2016/0017106 A1* | 1/2016 | Gerard | C09D 4/06 |
| | | | 524/533 |
| 2016/0017138 A1* | 1/2016 | Gerard | D06M 13/203 |
| | | | 525/94 |
| 2016/0032080 A1* | 2/2016 | Gerard | C08K 5/5313 |
| | | | 524/133 |
| 2016/0090434 A1* | 3/2016 | Gerard | C08F 220/14 |
| | | | 524/533 |

FOREIGN PATENT DOCUMENTS

| | | |
|---|---|---|
| JP | 2000119421 A | 4/2000 |
| JP | 2005-082612 | 3/2005 |
| WO | WO 2014/135815 A1 | 9/2014 |

OTHER PUBLICATIONS

Machine Translation of JP 2005048059.*
"Microbeads-Applications." Available at http://www.micro-beads.com/applications.aspx. (2005).*
Moon "Synthesis of Crosslinked Poly(methyl methacrylate) Beads in Emulsifier-Free Emulsion polymerization," Korea Polymer Journal, vol. 2, No. 1, pp. 54-60 (1994).*

* cited by examiner

*Primary Examiner* — Hannah J Pak
(74) *Attorney, Agent, or Firm* — Thomas F. Roland

(57) ABSTRACT

The invention relates to a liquid (meth)acrylic syrup for impregnating a fibrous substrate. The invention especially relates to a viscous liquid syrup mainly containing methacrylic or acrylic components. The invention also relates to a method for producing such a syrup. The invention relates further to a method for impregnating a fibrous substrate or long fibers with said viscous liquid syrup. The invention also relates to a fibrous substrate pre impregnated with said syrup, which is useful for the production of mechanical or structured parts or products. The invention also relates to a production method for producing mechanical or structured parts or items and to three-dimensional mechanical or structured parts produced by said method. The invention allows significant reduction of the exothermic peak during the polymerization of the syrup, reduction of the residual monomer content at the end of the polymerization, and production of parts in a composite material without defects or with few defects.

19 Claims, No Drawings

LIQUID (METH)ACRYLIC SYRUP FOR IMPREGNATING A FIBROUS SUBSTRATE, METHOD FOR IMPREGNATING A FIBROUS SUBSTRATE, AND COMPOSITE MATERIAL PRODUCED AFTER POLYMERISATION OF SAID PRE-IMPREGNATED SUBSTRATE

This application claims benefit, under U.S.C. § 119 or § 365 of PCT Application Number PCT/FR2014/050532, filed Mar. 7, 2014; and French Application Number FR 13.52119, filed Mar. 8, 2013.

FIELD OF THE INVENTION

The present invention relates to a liquid (meth)acrylic syrup for impregnating a fibrous substrate.

More particularly, the invention relates to a viscous liquid (meth)acrylic syrup mainly containing methacrylic or acrylic components and organic or mineral fillers intended to reduce the proportion of residual monomer after polymerization of the (meth)acrylic syrup. The invention also relates to a process for impregnating a fibrous substrate or long fibers with said viscous liquid syrup. The invention also relates to a fibrous substrate preimpregnated with said syrup which is useful for manufacturing composite parts.

The present invention also relates to a process for manufacturing composite parts and to composite parts obtained via this process.

PRIOR ART

Mechanical parts that have to withstand high stresses during their use are widely manufactured from composite materials. A composite material is a macroscopic combination of two or more immiscible materials. The composite material consists of at least one material which forms the matrix, i.e. a continuous phase that ensures the cohesion of the structure, and a reinforcing material.

The purpose of using a composite material is to obtain performance qualities that are not available from each of its constituents when they are used separately. Consequently, composite materials are widely used in several industrial sectors, for instance building, automotive, aerospace, transport, leisure, electronics and sport, notably due to their better mechanical performance (higher tensile strength, higher tensile modulus, higher fracture toughness) and their low density, in comparison with homogeneous materials.

The most important class, in view of volume at the commercial industrial scale, is that of composites with organic matrices, in which the matrix material is generally a polymer. The matrix of a polymeric composite material is either a thermoplastic polymer or a thermosetting polymer.

Thermosetting polymers consist of crosslinked three-dimensional structures. The crosslinking is obtained by curing reactive groups in a prepolymer. Curing may be obtained, for example, by heating the polymer chains in order to crosslink and harden the material permanently. In order to prepare the polymeric composite material, a prepolymer is mixed with the other component such as glass beads or fibers, or the other component is wetted or impregnated and cured afterwards. Examples of prepolymers or matrix material for thermosetting polymers are unsaturated polyesters, vinyl esters, and epoxy or phenolic materials.

A major drawback of a thermosetting polymer matrix is its crosslinking. The matrix cannot be easily fashioned into other forms. Once the polymer has crosslinked, the form is set. This also makes difficult the recycling of the thermosetting composite material and of manufactured mechanical or structured parts or articles comprising said thermosetting composite material, which are burned in a cement plant or thrown into a waste dump. Another major drawback of all thermosetting matrices is their fragility.

To allow thermoforming and recycling, it is preferred to use thermoplastic polymers.

Thermoplastic polymers consist of linear or branched polymers, which are not crosslinked. The thermoplastic polymers are heated in order to mix the constituents necessary for manufacturing the composite material and are cooled to set the final form. The problem of these molten thermoplastic polymers is their very high viscosity. In order to prepare a polymeric composite material based on thermoplastic polymer, a thermoplastic polymer resin, commonly known as a "syrup", is used to impregnate the reinforcing material, for example a fibrous substrate. Once polymerized, the thermoplastic polymer syrup constitutes the matrix of the composite material. At the time of impregnation, the viscosity of the impregnation syrup must be controlled and adapted so as not to be too fluid or too viscous, so as to impregnate correctly each fiber of the fibrous substrate. When the wetting is partial, depending on whether the syrup is too fluid or too viscous, "naked" zones, i.e. non-impregnated zones, and zones in which drops of polymer form on the fibers, which are the cause of the creation of bubbles, respectively appear. These "naked" zones and these bubbles give rise to the appearance of defects in the final composite material, which are the cause, inter alia, of a loss of mechanical strength of the final composite material. A syrup that satisfies this problem was developed by the Applicant and is described in patent application FR 1159553, or its PCT extension WO 2013/056845, and in patent application FR 1256929 or its PCT extension WO 2014/013028.

The Applicant has thus developed a (meth)acrylic syrup for impregnating a fibrous substrate, so as to produce parts made of (meth)acrylic thermoplastic composite material. The Applicant found that a syrup based only on (meth)acrylic monomer is too fluid. It thus produced a syrup by mixing a (meth)acrylic polymer with the (meth)acrylic monomer, so as to increase the viscosity of the syrup and to produce a syrup whose viscosity is optimal for impregnating the fibers of the fibrous substrate.

However, the Applicant found that the composition of the syrup could be further improved. Specifically, during polymerization of the (meth)acrylic syrup impregnating the fibrous substrate, for the production of composite parts, the (meth)acrylic syrup comprises between 70% and 90% of (meth)acrylic monomer to be converted into polymer. Now, since the polymerization is a radical polymerization, it gives rise to an exothermic peak. This peak is proportionately greater the larger the amount of monomer to be converted. However, an excessively large increase in temperature at the time of polymerization may give rise to problems, and especially the appearance of surface defects in the final composite material. Furthermore, the more monomer there is to be converted, the greater the risk of having residual monomer at the end of polymerization. The presence of residual (meth)acrylic monomer poses hygiene and safety problems due to its flammability and its toxicity. It is in particular a powerful allergen.

Finally, the density of the (meth)acrylic monomer is less than that of the (meth)acrylic polymer. This difference in density leads, during polymerization, to the appearance of shrinkage. Consequently, this shrinkage needs to be taken into account in the design of the mold.

To reduce the content of (meth)acrylic monomer in the syrup, the Applicant is also confronted with the problem that the viscosity of the syrup needs to be maintained at an optimum value in order to obtain correct impregnation of the fibrous substrate. However, the content of (meth)acrylic monomer in the (meth)acrylic syrup cannot be reduced without modifying the viscosity since this depends on the concentration of polymer and the weight-average molecular mass of the polymer. Increasing the content of (meth)acrylic polymer in the (meth)acrylic syrup without decreasing the weight-average molecular mass thus amounts to increasing the viscosity of the syrup, which cannot be envisaged since, in this case, the impregnation of fibrous substrate is incorrect. Reducing the weight-average molecular mass, i.e. reducing the length of the polymer chains, to be able to increase the content of (meth)acrylic polymer in the (meth) acrylic syrup cannot be envisaged either, since a decrease in the weight-average molecular mass implies a decrease in the mechanical properties of the final composite, especially greater fragility, characterized by a decrease in the breaking stresses.

TECHNICAL PROBLEM

The aim of the invention is thus to remedy at least one of the abovementioned drawbacks.

The invention is directed especially toward proposing a (meth)acrylic syrup intended to impregnate a fibrous substrate and then to be polymerized, the syrup having a composition such that it can significantly reduce the exothermic peak generated by the polymerization, and also the content of residual monomer at the end of polymerization and shrinkage.

The invention is also directed toward proposing a part made of thermoplastic composite material whose thermoplastic matrix obtained after polymerization of the syrup has few or no defects.

The invention is also directed toward completely, correctly and uniformly wetting the fibrous substrate during the impregnation. Any defects of fiber wetting, for example by bubbles and voids, decrease the mechanical performance of the final composite part.

Another object of the present invention is to propose a process that can be performed at low cost and that allows large-scale manufacture of mechanical parts or structural elements made of thermoplastic composite material. In addition, the process should be easy and simple to perform using commercially available compounds. The manufacture of the composite parts should also be reproducible and fast, meaning short cycle times.

BRIEF DESCRIPTION OF THE INVENTION

It has been discovered, surprisingly, that a liquid (meth) acrylic syrup for impregnating a fibrous substrate, said fibrous substrate consisting of long fibers, said syrup being characterized in that it comprises:
 a) a (meth)acrylic polymer,
 b) a (meth)acrylic monomer,
 c) fillers chosen from particles with a degree of swelling in the (meth)acrylic monomer of less than 200%, preferably less than 150% and advantageously less than 120% and a mean diameter $D_{50}$ of less than 50 µm, preferably less than 20 µm and advantageously less than 5 µm,
said liquid (meth)acrylic syrup having a dynamic viscosity of between 10 mPa·s and 10 000 mPa·s, preferably between 50 mPa·s and 5000 mPa·s and advantageously between 100 mPa·s and 1000 mPa·s, gives complete and correct impregnation of the fibrous substrate while at the same time having, in its composition, a reduced content of monomer, to the point that the polymerization is virtually complete, i.e. the residual monomer content at the end of polymerization is significantly reduced. Furthermore, as a result of this reduced monomer content in the syrup composition, the temperature of the exothermic peak during the polymerization of the syrup is significantly lowered.

Surprisingly, it has also been discovered that when the fillers are chosen from at least one of the following fillers:
 PMMA beads crosslinked with a crosslinking agent present in proportions of greater than 0.5%, preferably greater than 1% and advantageously greater than 2% by weight of the PMMA beads, said crosslinked PMMA beads having a degree of swelling in the (meth)acrylic monomer of less than 200%, preferably less than 150% and advantageously less than 120%, and a mean diameter $D_{50}$ of less than 50 µm, preferably less than 20 µm and advantageously less than 5 µm,
 hollow glass beads whose mean diameter $D_{50}$ is less than 50 µm, preferably less than 20 µm and advantageously less than 5 µm,
the (meth)acrylic syrup gives complete and correct impregnation of the fibrous substrate while at the same time having, in its composition, a reduced content of monomer, to the point that the polymerization is virtually complete, i.e. the residual monomer content at the end of polymerization is significantly reduced. Furthermore, as a result of this reduced monomer content in the syrup composition, the temperature of the exothermic peak during the polymerization of the syrup is significantly lowered.

The Applicant has also discovered, surprisingly, that an impregnation process for impregnating a fibrous substrate, said fibrous substrate consisting of long fibers and said process comprising a step of impregnating said fibrous substrate with said liquid (meth)acrylic impregnation syrup, gives complete and correct impregnation of the fibrous substrate.

It has also been discovered, surprisingly, that a process for manufacturing composite parts, comprising the following steps:
 a) impregnating a fibrous substrate with such a liquid (meth)acrylic syrup,
 b) polymerizing the liquid (meth)acrylic syrup impregnating said fibrous substrate,
makes it possible to obtain thermoplastic composite parts that have good mechanical properties and virtually no defects. Furthermore, at the time of polymerization, the temperature of the exothermic peak is significantly lowered and the shrinkage of the thermoplastic matrix becomes imperceptible.

DETAILED DESCRIPTION

The term "fibrous substrate" as used refers to fabrics, felts or nonwovens that may be in the form of strips, laps, braids, locks or pieces.

The term "(meth)acrylic" as used refers to any type of acrylic or methacrylic monomer.

The term "PMMA" as used refers to horno- and copolymers of methyl methacrylate (MMA), the weight ratio of MMA in the PMMA being at least 70 wt % for the MMA copolymer.

The term "monomer" as used refers to a molecule which can undergo polymerization.

The term "polymerization" as used refers to the process of converting a monomer or a mixture of monomers into a polymer, The term "thermoplastic polymer" as used refers to a polymer that turns to a liquid or becomes more liquid or less viscous when heated and that can take on new shapes by the application of heat and pressure.

The term "thermosetting polymer" as used refers to a prepolymer in a soft, solid or viscous state that changes irreversibly into an unmeltable, insoluble polymer network by curing.

The term "polymer composite" as used refers to a multicomponent material comprising several different phase domains, among which at least one type of phase domain is a continuous phase and in which at least one component is a polymer.

The term "degree of swelling" as used in the present invention refers to the capacity of a particle immersed in a compound to change in volume. A degree of swelling equal to 100% means that the particle remains unchanged. A degree of swelling of greater than 100% reveals a volume expansion of the particle and a degree of swelling of less than 100% reveals a volume contraction of the particle. A degree of swelling of 200% means that the particle has increased its volume by a factor of 2, which corresponds to an increase in the diameter of the particle of a factor of $\sqrt{2}$, A degree of swelling of 150% means that the particle has increased its volume by a factor of 1.5, which corresponds to an increase in the diameter of the particle of a factor of $\sqrt{1.5}$.

As regards the part made of composite material, it is a panel, a lid or a shell consisting of a composite material or of parts for aircraft, for boats (hull and bridge), railway vehicles (hatch, bulkhead, enclosure) and motor vehicle parts (bodywork, hood, door).

According to a first aspect, the present invention relates to a liquid (meth)acrylic syrup for impregnating a fibrous substrate, said fibrous substrate consisting of long fibers, said syrup being characterized in that it comprises:
a) a (meth)acrylic polymer,
b) a (meth)acrylic monomer,
c) fillers chosen from particles with a degree of swelling in the (meth)acrylic monomer of less than 200%, preferably less than 150% and advantageously less than 120% and a mean diameter $D_{50}$ of less than 50 μm, preferably less than 20 μm and advantageously less than 5 μm, said liquid (meth)acrylic syrup having a dynamic viscosity of between 10 mPa·s and 10 000 mPa·s, preferably between 50 mPa·s and 5000 mPa·s and advantageously between 100 mPa·s and 1000 mPa·s.

According to another aspect, the fillers are chosen from at least one of the following
PMMA beads crosslinked with a crosslinking agent present in proportions of greater than 0.5%, preferably greater than 1% and advantageously greater than 2% by weight of the PMMA beads, said crosslinked PMMA beads having a degree of swelling in the (meth)acrylic monomer of less than 200%, preferably less than 150% and advantageously less than 120%, and a mean diameter $D_{50}$ of less than 50 μm, preferably less than 20 μm and advantageously less than 5 μm,
hollow glass beads whose mean diameter $D_{50}$ is less than 50 μm, preferably less than 20 μm and advantageously less than 5 μm.

As regards the (meth)acrylic monomer, the monomer is chosen from acrylic acid, methacrylic acid, alkyl acrylic monomers, alkyl methacrylic monomers and mixtures thereof.

Preferably, the monomer is chosen from acrylic acid, methacrylic acid, alkyl acrylic monomers, alkyl methacrylic monomers and mixtures thereof, the alkyl group containing from 1 to 22 linear, branched or cyclic carbons; the alkyl group preferably containing from 1 to 12 linear, branched or cyclic carbons.

Advantageously, the (meth)acrylic monomer is chosen from methyl methacrylate, ethyl methacrylate, methyl acrylate, ethyl acrylate, methacrylic acid, acrylic acid, n-butyl acrylate, isobutyl acrylate, n-butyl methacrylate, isobutyl methacrylate, cyclohexyl acrylate, cyclohexyl methacrylate, isobornyl acrylate and isobornyl methacrylate, and mixtures thereof.

More advantageously, the (meth)acrylic monomer is chosen from methyl methacrylate, isobornyl acrylate and acrylic acid, and mixtures thereof.

According to a preferred embodiment, at least 50% by weight and preferably at least 60% by weight of the monomer is methyl methacrylate.

According to a more preferred embodiment, at least 50% by weight, preferably at least 60% by weight, more preferably at least 70% by weight, advantageously at least 80% by weight and even more advantageously 90% by weight of the monomer is a mixture of methyl methacrylate with isobornyl acrylate and/or acrylic acid.

As regards the (meth)acrylic polymer, mention may be made of polyalkyl methacrylates or polyalkyl acrylates. According to a preferred embodiment, the (meth)acrylic polymer is polymethyl methacrylate (PMMA).

The term "PMMA" denotes a methyl methacrylate (MMA) homopolymer or copolymer or mixtures thereof.

According to one embodiment, the methyl methacrylate (MMA) homo- or copolymer comprises at least 70%, preferably at least 80%, advantageously at least 90% and more advantageously at least 95% by weight of methyl methacrylate.

According to another embodiment, the PMMA is a mixture of at least one homopolymer and at least one copolymer of MMA, or a mixture of at least two homopolymers or two copolymers of MMA with a different average molecular weight, or a mixture of at least two copolymers of MMA with a different monomer composition.

The copolymer of methyl methacrylate (MMA) comprises from 70% to 99.7% by weight of methyl methacrylate and from 0.3% to 30% by weight of at least one monomer containing at least one ethylenic unsaturation that can copolymerize with methyl methacrylate.

These monomers are well known and mention may be made especially of acrylic and methacrylic acids and alkyl (meth)acrylates in which the alkyl group contains from 1 to 12 carbon atoms. As examples, mention may be made of methyl acrylate and ethyl, butyl or 2-ethylhexyl (meth) acrylate. Preferably, the comonomer is an alkyl acrylate in which the alkyl group contains from 1 to 4 carbon atoms.

According to a preferred embodiment, the copolymer of methyl methacrylate (MMA) comprises from 80% to 99.7%, advantageously from 90% to 99.7% and more advantageously from 90% to 99.5% by weight of methyl methacrylate and from 0.3% to 20%, advantageously from 0.3% to 10% and more advantageously from 0.5% to 10% by weight of at least one monomer containing at least one ethylenic unsaturation that can copolymerize with methyl methacrylate. Preferably, the comonomer is chosen from methyl acrylate and ethyl acrylate, and mixtures thereof.

The weight-average molecular mass of the (meth)acrylic polymer should be high, meaning more than 50 000 g/mol and preferably more than 100 000 g/mol.

The weight-average molecular mass can be measured by size exclusion chromatography (SEC).

The (meth)acrylic polymer is fully soluble in the (meth) acrylic monomer or in the mixture of (meth)acrylic monomers. It enables the viscosity of the (meth)acrylic monomer or the mixture of (meth)acrylic monomers to be increased. The solution obtained is generally called a "syrup" or "prepolymer". The dynamic viscosity value of the liquid (meth)acrylic syrup is between 10 mPa·s and 10 000 mPa·s, preferably between 50 mPa·s and 5000 mPa·s and advantageously between 100 mPa·s and 1000 mPa·s. The viscosity of the syrup can be readily measured with a rheometer or a viscometer. The dynamic viscosity is measured at 25° C. The liquid (meth)acrylic syrup has Newtonian behavior, meaning that there is no shear-thinning, so that the dynamic viscosity is independent of the shear in a rheometer or of the speed of the spindle in a viscometer. Such a viscosity of the syrup obtained allows correct impregnation of the fibers of the fibrous substrate.

Advantageously, the liquid (meth)acrylic syrup contains no additional voluntarily added solvent.

As regards the fillers, their incorporation into the (meth) acrylic syrup makes it possible to reduce the content of (meth)acrylic monomer in the (meth)acrylic syrup.

To obtain a (meth)acrylic syrup with an optimum viscosity for the impregnation of the fibers of the fibrous substrate, i.e. a viscosity of between 10 mPa·s and 10 000 mPa·s, preferably between 50 mPa·s and 5000 mPa·s and advantageously between 100 mPa·s and 1000 mPa·s, a polymer/monomer ratio of between 10% and 30% and a weight-average molecular mass of the (meth)acrylic polymer which must be high, i.e. greater than 50 000 g/mol and preferably greater than 100 000 g/mol, are needed.

The weight-average molecular weight may be measured by size exclusion chromatography.

Incorporation of crosslinked PMMA particles into the (meth)acrylic syrup makes it possible to increase the concentration of (meth)acrylic polymer in the (meth)acrylic syrup without, however, decreasing the weight-average molecular mass. Consequently, in this case, the polymer/monomer ratio is increased.

The crosslinked PMMA particles are in the form of beads. They are discrete particles that distribute very well and homogeneously in the (meth)acrylic syrup. Given that they are discrete crosslinked particles, they do not dissolve in the (meth)acrylic monomer. On the other hand, if the beads are not sufficiently crosslinked, there is a risk of this affecting the amount of monomer and a risk of the beads swelling in the monomer, leading to a significant increase in the viscosity of the syrup.

To avoid such an increase in viscosity and to conserve a viscosity of the (meth)acrylic syrup of between 10 mPa·s and 10 000 mPa·s, preferably between 50 mPa·s and 5000 mPa·s and advantageously between 100 mPa·s and 1000 mPa·s, the PMMA beads must thus be highly crosslinked. For this, they comprise a crosslinking agent whose proportions are greater than 0.5%, preferably greater than 1% and advantageously greater than 2% of the total weight of the PMMA beads.

The crosslinked PMMA beads show very good adhesion to the interface between the beads and the polymer matrix once the (methacrylic syrup has polymerized. The beads may participate in the polymerization reaction and thus bond covalently to the matrix. In this case, linear (meth)acrylic polymer molecules bond covalently to the surface of the beads. This adhesion to the interface makes it possible to improve the mechanical properties of the matrix obtained after polymerization of the syrup.

Preferably, the crosslinked PMMA beads have a degree of swelling in the (meth)acrylic monomer of less than 200%, preferably less than 150% and advantageously less than 120%.

Their mean diameter $D_{50}$ is less than 50 microns, preferably less than 20 microns and advantageously less than 5 microns. This mean particle diameter $D_{50}$ is measured by laser scattering granulometry, using an instrument of the Microtrac (trademark) range. For the estimation of the mean particle diameter, measurement is made of the mean volume diameter $D_{50}$ or D (v; 0.5), which corresponds to the particle size for which 50% of the sample has a size less than this size and 50% of the sample has a size greater than this size, or, in other words, the equivalent volume diameter at 50% cumulative volume. This size is also known as volume median diameter, which is related to the mass median diameter by the mass per unit volume of the particles, assuming a mass per unit volume independent of the size of the particles.

With such characteristics, the crosslinked PMMA beads may be introduced into the syrup with proportions of between 5% and 70% by weight, preferably between 10% and 70% by weight, more preferably between 5% and 65%, even more preferably between 20% and 60% and advantageously between 30% and 50%.

The composition of the liquid (meth)acrylic syrup according to a first mode of the invention is thus as follows:
a) from 10% by weight to 30% by weight of a (meth) acrylic polymer,
b) from 70% by weight to 90% by weight of a (meth) acrylic monomer,
c) from 0% by weight to 70% by weight of crosslinked PMMA beads.

Preferably, the composition of the liquid (meth)acrylic syrup according to the first mode of the invention is thus as follows:
a) from 5% by weight to 30% by weight of a (meth)acrylic polymer,
b) from 70% by weight to 90% by weight of a (meth) acrylic monomer,
c) from 5% by weight to 70% by weight of crosslinked PMMA beads.

More preferably, the composition of the liquid (meth) acrylic syrup according to the first mode of the invention is thus as follows:
a) from 10% by weight to 25% by weight of a (meth) acrylic polymer,
b) from 70% by weight to 85% by weight of a (meth) acrylic monomer,
c) from 5% by weight to 70% by weight of crosslinked PMMA beads.

Advantageously, the composition of the liquid (meth) acrylic syrup according to the first mode of the invention is thus as follows:
a) from 10% by weight to 25% by weight of a (meth) acrylic polymer,
b) from 70% by weight to 85% by weight of a (meth) acrylic monomer,
c) from 5% by weight to 20% by weight of crosslinked PMMA beads.

The composition of the liquid (meth)acrylic syrup according to the second mode of the invention is as follows:
a) from 5% by weight to 25% by weight of a (meth)acrylic polymer,
b) from 30% by weight to 70% by weight of a (meth)acrylic monomer,
c) from 5% by weight to 65% by weight of crosslinked PMMA beads.

Preferably, the composition of the liquid (meth)acrylic syrup according to the second mode of the invention is as follows:
a) from 5% by weight to 20% by weight of a (meth)acrylic polymer,
b) from 35% by weight to 60% by weight of a (meth)acrylic monomer,
c) from 20% by weight to 60% by weight of crosslinked PMMA beads.

Advantageously, the composition of the liquid (meth)acrylic syrup according to the second mode of the invention is thus as follows:
a) from 5% by weight to 15% by weight of a (meth)acrylic polymer,
b) from 35% by weight to 55% by weight of a (meth)acrylic monomer,
c) from 30% by weight to 50% by weight of crosslinked PMMA beads.

By virtue of the presence of these crosslinked PMMA beads in the syrup, the monomer content is reduced, to the point that at the end of polymerization of the (meth)acrylic syrup, only a very small amount of residual monomer remains, or even none at all. The exothermic peak generated by the polymerization is also lowered. The shrinkage is also significantly reduced.

The crosslinked PMMA beads may be replaced, or incorporated with other mineral particles, in particular hollow glass beads.

These glass beads are generally made of borosilicate. These beads are hollow, they have a low density, they are very chemically stable and have good compression strength. Their low density allows them to be dispersed very easily in the syrup. They do not swell in the (meth)acrylic monomer and therefore do not influence the viscosity of the syrup. Consequently, it is possible to introduce a high content thereof, between 5% and 70% by weight, preferably between 10% and 70%, more preferably between 5% and 65%, even more preferably between 20% and 60% and advantageously between 30% and 50%. Consequently, a syrup is obtained whose optimum viscosity is conserved, i.e. between 10 mPa·s and 10 000 mPa·s, preferably between 50 mPa·s and 5000 mPa·s and advantageously between 100 mPa·s and 1000 mPa·s, which allows very good impregnation of the fibers of fibrous substrate, and which comprises a reduced monomer content. Consequently, during the polymerization, the temperature of the exothermic peak is reduced, the content of residual monomer at the end of polymerization is significantly reduced and the shrinkage is also significantly reduced.

Preferably, to obtain homogeneous distribution of the glass beads in the fibers of the fibrous substrate at the time of impregnation, the glass beads have a mean diameter $D_{50}$ of less than 50 microns, preferably less than 20 microns and advantageously less than 5 microns. This volume-median diameter of the particles is measured by laser scattering granulometry, using an instrument of the Microtrac (trademark) range. Thus, the glass beads distribute throughout the composite material and also contribute toward obtaining a composite that has good mechanical properties and especially good compression strength.

The composition of the liquid (meth)acrylic syrup according to the third mode of the invention is thus as follows:
a) from 10% by weight to 30% by weight of a (meth)acrylic polymer,
b) from 70% by weight to 90% by weight of a (meth)acrylic monomer,
c) from 0% by weight to 70% by weight of hollow glass beads.

Preferably, the composition of the liquid (meth)acrylic syrup according to the third mode of the invention is as follows:
a) from 5% by weight to 30% by weight of a (meth)acrylic polymer,
b) from 70% by weight to 90% by weight of a (meth)acrylic monomer,
c) from 5% by weight to 70% by weight of hollow glass beads.

More preferably, the composition of the liquid (meth)acrylic syrup according to the third mode of the invention is as follows:
a) from 10% by weight to 25% by weight of a (meth)acrylic polymer,
b) from 70% by weight to 85% by weight of a (meth)acrylic monomer,
c) from 5% by weight to 70% by weight of hollow glass beads.

Advantageously, the composition of the liquid (meth)acrylic syrup according to the third mode of the invention is as follows:
a) from 10% by weight to 25% by weight of a (meth)acrylic polymer,
b) from 70% by weight to 85% by weight of a (meth)acrylic monomer,
c) from 5% by weight to 20% by weight of hollow glass beads.

The composition of the liquid (meth)acrylic syrup according to the fourth mode of the invention is as follows:
a) from 5% by weight to 25% by weight of a (meth)acrylic polymer,
b) from 30% by weight to 70% by weight of a (meth)acrylic monomer,
c) from 5% by weight to 65% by weight of hollow glass beads.

Preferably, the composition of the liquid (meth)acrylic syrup according to the fourth mode of the invention is as follows:
a) from 5% by weight to 20% by weight of a (meth)acrylic polymer,
b) from 35% by weight to 60% by weight of a (meth)acrylic monomer,
c) from 20% by weight to 60% by weight of hollow glass beads.

Advantageously, the composition of the liquid (meth)acrylic syrup according to the fourth mode of the invention is thus as follows:
a) from 5% by weight to 15% by weight of a (meth)acrylic polymer,
b) from 35% by weight to 55% by weight of a (meth)acrylic monomer,
c) from 30% by weight to 50% by weight of hollow glass beads.

All the fillers are added to the liquid (meth)acrylic syrup, at room temperature, before the impregnation.

As regards the process for manufacturing the liquid (meth)acrylic syrup, a first step consists in preparing a first syrup comprising the (meth)acrylic monomer or mixture of (meth)acrylic monomers and a (meth)acrylic polymer. The fillers, whether they are crosslinked PMMA beads or hollow glass beads, or a mixture of these two types of particles, are then incorporated into the (meth)acrylic syrup, at room temperature of about 20° C., in the proportions indicated above so as to conserve a dynamic viscosity of between 10 mPa·s and 10 000 mPa·s, preferably between 50 mPa·s and 5000 mPa·s and advantageously between 100 mPa·s and 1000 mPa·s.

As regards the process for impregnating the fibrous substrate, it comprises a step of impregnating the fibrous substrate with the liquid (meth)acrylic syrup. This impregnation step takes place in a closed mold.

If the viscosity of the liquid (meth)acrylic syrup at a given temperature is slightly too high for the impregnation process, it is possible to heat the syrup so as to have a more liquid syrup for sufficient wetting and correct and complete impregnation of the fibrous substrate.

As regards the fibrous substrate, mention may be made of fabrics, felts or nonwovens that may be in the form of strips, laps, braids, locks or pieces. The fibrous material may have various forms and dimensions, either one-dimensional, two-dimensional or three-dimensional. A fibrous substrate comprises an assembly of one or more fibers. When the fibers are continuous, their assembly forms fabrics.

The one-dimensional form corresponds to linear fibers. The fibers may be discontinuous or continuous. The fibers may be arranged randomly or parallel to each other, in the form of a continuous filament. A fiber is defined by its aspect ratio, which is the ratio between length and diameter of the fiber. The fibers used in the present invention are long fibers or continuous fibers. The fibers have a length ratio of at least 1000, preferably at least 1500, more preferably at least 2000, advantageously at least 3000 and most advantageously at least 5000.

The two-dimensional form corresponds to nonwoven or woven fibrous mats or reinforcements or bundles of fibers, which may also be braided.

The three-dimensional form corresponds, for example, to nonwoven fibrous mats or reinforcements or stacked or folded bundles of fibers or mixtures thereof, an assembly of the two-dimensional form in the third dimension.

The origins of the fibrous material may be natural or synthetic. As natural material one can mention plant fibers, wood fibers, animal fibers or mineral fibers.

Natural fibers are, for example, sisal, jute, hemp, flax, cotton, coconut fibers, and banana fibers. Animal fibers are, for example, wool or hair.

As synthetic material, mention may be made of polymeric fibers chosen from fibers of thermosetting polymers, of thermoplastic polymers or mixtures thereof.

The polymeric fibers may consist of polyamide (aliphatic or aromatic), polyester, polyvinyl alcohol, polyolefins, polyurethanes, polyvinyl chloride, polyethylene, unsaturated polyesters, epoxy resins and vinyl esters.

The mineral fibers may also be chosen from glass fibers, especially of E, R or S2 type, carbon fibers, boron fibers or silica fibers.

The fibrous substrate of the present invention is chosen from plant fibers, wood fibers, animal fibers, mineral fibers, synthetic polymeric fibers, glass fibers and carbon fibers, or mixtures thereof.

Preferably, the fibrous substrate is chosen from mineral fibers.

According to an additional aspect, the invention relates to a polymeric composite material comprising a thermoplastic (meth)acrylic matrix and a fibrous substrate used as reinforcement, in which the fibrous substrate consists of long fibers, said composite material being characterized in that the thermoplastic (meth)acrylic matrix is obtained after polymerization of said fibrous substrate preimpregnated with said liquid (meth)acrylic syrup.

Another aspect of the present invention is a process for manufacturing mechanical or structural parts made of composite material, comprising the following steps:
 a) impregnating a fibrous substrate with the liquid (meth)acrylic syrup,
 b) polymerizing the liquid (meth)acrylic syrup impregnating said fibrous substrate.

The impregnation of the fibrous substrate in step a) is preferably performed in a closed mold.

Advantageously, step a) and step b) are performed in the same closed mold.

As regards the process for manufacturing composite parts, various processes may be used for preparing parts. Mention may be made of infusion, vacuum bag molding, pressure bag molding, autoclave molding, resin transfer molding (RTM), reaction injection molding (RIM), reinforced reaction injection molding (R-RIM) and variants thereof, press molding or compression molding.

The preferred manufacturing processes for manufacturing composite parts are processes in which the liquid (meth)acrylic syrup is transferred to the fibrous substrate by impregnation of the fibrous substrate in a mold, more preferably in a closed mold.

Advantageously, the step of impregnating the fibrous material is performed in a closed mold.

Most advantageously, the process for manufacturing composite parts is chosen from resin transfer molding and infusion.

All the processes comprise the step of impregnating the fibrous substrate with the liquid (meth)acrylic syrup before the step of polymerization in a mold.

The step of polymerization of the liquid (meth)acrylic syrup impregnating said fibrous substrate takes place after the step of impregnation in the same mold.

Resin transfer molding is a process using a two-sided mold set which forms both surfaces of a composite material. The lower side is a rigid mold. The upper side can be a rigid or flexible mold. Flexible molds can be made from composite materials, silicone or extruded polymer films such as nylon. The two sides fit together to form a mold cavity. The distinguishing feature of resin transfer molding is that the fibrous substrate is placed into this cavity and the mold set is closed prior to the introduction of the liquid (meth)acrylic syrup. Resin transfer molding includes numerous varieties which differ in the mechanics of introduction of the liquid (meth)acrylic syrup into the fibrous substrate in the mold cavity. These variations range from vacuum infusion to vacuum assisted resin transfer molding (VARTM). This process may be performed at room or elevated temperature.

With the infusion process, the liquid (meth)acrylic syrup must have the appropriate viscosity for this process for preparing the polymeric composite material. The liquid (meth)acrylic syrup is sucked into the fibrous substrate, which is in a special mold, by applying a gentle vacuum. The fibrous substrate is infused and completely impregnated by the liquid (meth)acrylic syrup.

One advantage of this process is the large amount of fibrous material in the composite.

As regards the use of the composite parts thus manufactured, mention may be made of automotive applications, nautical applications, railroad applications, sport, aeronautic and aerospace applications, photovoltaic applications, computer related applications, telecommunication applications and wind energy applications.

The composite part is especially a motor vehicle part, boat part, train part, sport article, plane or helicopter part, space ship or rocket part, photovoltaic module part, wind turbine part, furniture part, construction or building part, telephone or cell phone part, computer or television part, printer or photocopier part.

As regards the recycling of the thermoplastic composite part, it may be performed by grinding or depolymerization of the thermoplastic polymer.

Grinding is performed mechanically in order to obtain smaller pieces of the part. As the part comprises a thermoplastic polymer, this polymer can be heated, and the pieces once again transformed within a certain limit in order to obtain a recycled object.

Preferably, the thermoplastic composite part is heated to perform pyrolysis or thermal decomposition of the (meth)acrylic polymer and to recover methyl methacrylate as monomer.

Advantageously, at least 90% by weight of the MMA present in the polymer is recovered by thermal decomposition.

The part is brought to a temperature of at least 500° C. and less than or equal to 600° C.

EXAMPLES

Example 1: Manufacture of a Thermoplastic Composite Based on a (Meth)Acrylic Syrup Comprising Crosslinked PMMA Beads First Step: Synthesis of the Crosslinked PMMA Beads Crosslinked PMMA beads were synthesized by suspension polymerization of methyl methacrylate (MMA) and of ethyl acrylate as comonomer, present in proportions preferably less than 10% and advantageously less than 5% by weight, using a peroxide with a decomposition temperature for a half-life of one minute of greater than 100° C., at a concentration of less than 1%, preferably less than 0.5% and advantageously less than 0.3%. Allyl methacrylate (ALMA) or butanediol dimethacrylate (BDDMA) may be used as crosslinking agent, in weight proportions preferably greater than 0.5% by weight, preferably greater than 1% by weight and advantageously greater than 2% by weight, and a poly(2-acrylamido-2-methylpropanesulfonic acid) (PAMS) may be used as suspension agent.

The size of the beads may be controlled by varying the content of suspension agent and the stirring speed in the reactor. The synthesized beads have diameters ranging from 5 μm to 20 μm.

The degree of crosslinking has a direct influence on the degree of swelling.

The synthesized beads have a degree of swelling in the (meth)acrylic monomer of 150%.

The degree of swelling is estimated by the change in size of the particles in a solvent, in the present case the monomer. The particle size is measured by dynamic light scattering (DLS), which is a non-destructive spectroscopic analysis technique that affords access to the particle size in suspension, in a liquid, which is well known for characterizing the size of particles. When the particles are in the monomer, swelling is observed in comparison with these same particles in water. The particle size comparison indicates swelling if the particle size in the (meth)acrylic monomer $d_m$ (diameter in monomer) is greater than the particle size in water $d_0$ (diameter in water). The degree of swelling is calculated according to the following formula:

$$100 \times (d_m/d_0)^3 \text{ in \%}$$

if the particle size increases from a volume-median diameter $D_{50}$ of 2 μm in water to 2.2 μm in the (meth)acrylic monomer, the degree of swelling is 133%.

Second Step: Preparation of the (Meth)Acrylic Syrup

A syrup is prepared by dissolving 10% by weight of the PMMA (BS520, a copolymer of MMA comprising ethyl acrylate as comonomer, sold by the company Altuglas International) in 90% by weight of methyl methacrylate, which is stabilized with HQME (hydroquinone monomethyl ether).

The beads prepared in step 1 are incorporated into this (meth)acrylic syrup, such that the proportions of (meth)acrylic polymer, of (meth)acrylic monomer and of crosslinked PMMA beads in the syrup are the following: 5% of (meth)acrylic polymer, 45% of methyl methacrylate and 50% of crosslinked PMMA beads.

The (meth)acrylic syrup obtained has a viscosity of 875 mPa·s at 25° C.

To the 100 parts by weight of the syrup are added 2 parts by weight of benzoyl peroxide (BPO—Luperox A75 from the company Arkema) and 0.2 part by weight of DMPT (N,N-dimethyl-p-toluidine from Sigma-Aldrich).

Third Step: Impregnation of a Fibrous Substrate and Polymerization

A fibrous substrate made of glass fiber is placed in a closed mold. The (meth)acrylic syrup is injected into the closed mold comprising the glass fabric, and polymerized at 25° C. for 80 minutes.

During the polymerization, a reduction in the temperature of the exothermic peak is observed in comparison with a (meth)acrylic syrup of the same viscosity but comprising 25% by weight of (meth)acrylic polymer and 75% by weight of (meth)acrylic monomer. The temperature of the exothermic peak in this case is lowered by 10° C.

The composite part obtained shows no shrinkage and has no surface defects.

Example 2: Manufacture of a Thermoplastic Composite Based on a (Meth)Acrylic Syrup Comprising Glass Beads First Step: Preparation of the (Meth)Acrylic Syrup A syrup is prepared by dissolving 10% by weight of the PMMA (BS520, a copolymer of MMA comprising ethyl acrylate as comonomer) in 90% by weight of methyl methacrylate, which is stabilized with HQME (hydroquinone monoethyl ether).

Hollow glass beads (from the company 3M) with a diameter of 5 μm are incorporated into the (meth)acrylic syrup, such that the proportions of (meth)acrylic polymer, of (meth)acrylic monomer and of glass beads in the syrup are the following: 5% of (meth)acrylic polymer, 45% of methyl methacrylate and 50% of glass beads.

The (meth)acrylic syrup obtained has a viscosity of 734 mPa·s at 25° C.

To the 100 parts by weight of the syrup are added 2 parts by weight of benzoyl peroxide (BPO—Luperox A75 from the company Arkema) and 0.2 part by weight of DMPT (N,N-dimethyl-p-toluidine from Sigma-Aldrich).

Second Step: Impregnation of a Fibrous Substrate and Polymerization

A fibrous substrate made of glass fiber is placed in a closed mold. The (meth)acrylic syrup is injected into the closed mold comprising the glass fabric, and polymerized at 25° C. for 80 minutes.

During the polymerization, a reduction in the temperature of the exothermic peak is observed in comparison with a (meth)acrylic syrup of the same viscosity but comprising 25% by weight of polymer and 75% by weight of monomer. The temperature of the exothermic peak in this case is 32° C.

The composite part obtained shows no shrinkage, has no surface defects and has improved compression strength.

The invention claimed is:

1. A liquid (meth)acrylic syrup for impregnating a fibrous substrate, said fibrous substrate consisting of long fibers, said liquid (meth)acrylic syrup comprising:
   a) a (meth)acrylic polymer,
   b) a (meth)acrylic monomer,
   c) fillers, wherein said fillers comprise PMMA beads crosslinked with a crosslinking agent present in proportions of greater than 0.5% by weight of the PMMA beads, said crosslinked PMMA beads having a degree of swelling in the (meth)acrylic monomer of less than 200%, the degree of swelling being defined as the capacity of a particle immersed in a compound to change in volume, and a mean diameter $D_{50}$ of less than 50 μm;
   wherein said crosslinked PMMA beads represent from 10% to 70% by weight of the total liquid (meth)acrylic syrup, and wherein said crosslinked PMMA beads comprise at least 80% by weight of methyl methacrylate monomer units,
   said liquid (meth)acrylic syrup having a dynamic viscosity of between 10 mPa·s and 10000 mPa·s, and wherein the fillers further comprise hollow glass beads whose mean diameter $D_{50}$ is less than 50 μm and represent between 10 to 70% by weight of the total liquid (meth)acrylic syrup.

2. The liquid (meth)acrylic syrup as claimed in claim 1, wherein the (meth)acrylic polymer is a homo- or copolymer of methyl methacrylate (MMA) or a mixture thereof.

3. The liquid (meth)acrylic syrup as claimed in claim 2, wherein the copolymer of methyl methacrylate (MMA) comprises at least 70% by weight of methyl methacrylate (MMA).

4. The liquid (meth)acrylic syrup as claimed in claim 2, wherein the copolymer of methyl methacrylate (MMA) comprises from 70% to 99.7% by weight of methyl methacrylate and from 0.3 to 30% by weight of at least one monomer bearing at least one ethylenic unsaturation that can copolymerize with methyl methacrylate.

5. The liquid (meth)acrylic syrup as claimed in claim 2, wherein the (meth)acrylic polymer comprises a comonomer, said comonomer being an alkyl acrylate containing an alkyl group of 1 to 12 carbon atoms.

6. The liquid (meth)acrylic syrup as claimed in claim 5, wherein the comonomer is selected from the group consisting of methyl acrylate, ethyl acrylate, and a mixture thereof.

7. The liquid (meth)acrylic syrup as claimed in claim 1, wherein the (meth)acrylic monomer is selected from the group consisting of acrylic acid, methacrylic acid, alkyl acrylic monomers and alkyl methacrylic monomers, and mixtures thereof, wherein said alkyl group in said alkyl acrylic and alkyl methacrylic monomers contains from 1 to 22 linear, branched or cyclic carbons.

8. The liquid (meth)acrylic syrup as claimed in claim 7, wherein the (meth)acrylic monomer is selected from the group consisting of methyl methacrylate, ethyl methacrylate, methyl acrylate, ethyl acrylate, methacrylic acid, acrylic acid, n-butyl acrylate, isobutyl acrylate, n-butyl methacrylate, isobutyl methacrylate, cyclohexyl acrylate, cyclohexyl methacrylate, isobornyl acrylate and isobornyl methacrylate, and mixtures thereof.

9. The liquid (meth)acrylic syrup as claimed in claim 7, wherein the (meth)acrylic monomer is selected from the group consisting of methyl methacrylate, isobornyl acrylate and acrylic acid, and mixtures thereof.

10. The liquid (meth)acrylic syrup as claimed in claim 7, wherein 50% by weight of the (meth)acrylic monomer is methyl methacrylate.

11. An impregnation process for impregnating a fibrous substrate, said fibrous substrate consisting of long fibers and said process comprising a step of impregnating said fibrous substrate with said (meth)acrylic syrup as claimed in claim 1.

12. The impregnation process as claimed in claim 11, wherein the step of impregnating said fibrous substrate is performed in a closed mold.

13. A polymeric composite material comprising a thermoplastic (meth)acrylic matrix and a fibrous substrate used as reinforcement, in which the fibrous substrate consists of long fibers, said composite material being characterized in that the thermoplastic (meth)acrylic matrix is obtained after polymerization of said fibrous substrate preimpregnated with said liquid (meth)acrylic syrup as claimed in claim 1.

14. A process for manufacturing mechanical or structural parts made of composite material, comprising the following steps:
   a) impregnating a fibrous substrate with the liquid (meth)acrylic syrup as claimed in claim 1,
   b) polymerizing the liquid (meth)acrylic syrup impregnating said fibrous substrate.

15. The manufacturing process as claimed in claim 14, wherein the impregnation of the fibrous substrate in step a) is performed in a closed mold.

16. The manufacturing process as claimed in claim 14, wherein step a) and step b) are performed in the same closed mold.

17. The manufacturing process as claimed in claim 14, wherein the process is chosen from resin transfer molding and infusion.

18. A mechanical or structural part comprising the polymeric composite material as claimed in claim 13.

19. The part as claimed in claim 18, said part being a motor vehicle part, boat part, train part, sport article, plane or helicopter part, space ship or rocket part, photovoltaic module part, wind turbine part, furniture part, construction or building part, telephone or cellphone part, computer or television part, printer or photocopier part.

* * * * *